US008001611B2

(12) United States Patent
Nelson et al.

(10) Patent No.: US 8,001,611 B2
(45) Date of Patent: Aug. 16, 2011

(54) SYSTEM AND METHOD FOR ENSURING SECURITY WITH MULTIPLE AUTHENTICATION SCHEMES

(75) Inventors: Kenneth Carlin Nelson, Hollister, CA (US); Marilene Araujo Noronha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 11/975,579

(22) Filed: Oct. 18, 2007

(65) Prior Publication Data

US 2008/0307520 A1    Dec. 11, 2008

Related U.S. Application Data

(63) Continuation of application No. 10/131,008, filed on Apr. 23, 2002, now Pat. No. 7,308,580.

(51) Int. Cl.
*G06F 7/04* (2006.01)
*G06K 9/00* (2006.01)

(52) U.S. Cl. ............... 726/27; 713/182; 726/28; 726/8; 726/2; 726/17; 707/781; 707/694

(58) Field of Classification Search ........................ None
See application file for complete search history.

(56) References Cited

U.S. PATENT DOCUMENTS

| 5,390,312 A | 2/1995 | Chairot et al. ............... 395/400 |
| 5,495,533 A | 2/1996 | Linehan et al. ............... 713/155 |
| 5,504,892 A | 4/1996 | Atsatt et al. |
| 5,552,776 A | 9/1996 | Wade et al. .................. 340/5.74 |
| 5,560,005 A | 9/1996 | Hoover et al. ................ 395/600 |
| 5,627,987 A | 5/1997 | Nozue et al. .................. 395/410 |
| 5,649,099 A | 7/1997 | Theimer et al. |
| 5,701,458 A | 12/1997 | Bsaibes et al. |
| 5,758,153 A | 5/1998 | Atsatt et al. |
| 5,774,668 A | 6/1998 | Choquier et al. ........ 395/200.53 |
| 5,778,222 A | 7/1998 | Herrick et al. |
| 5,941,947 A | 8/1999 | Brown et al. ................. 709/225 |
| 6,014,666 A | 1/2000 | Helland et al. .................... 707/9 |
| 6,052,785 A * | 4/2000 | Lin et al. .......................... 726/5 |
| 6,105,027 A | 8/2000 | Schneider et al. ................ 707/9 |
| 6,141,754 A | 10/2000 | Choy ............................. 713/200 |

(Continued)

FOREIGN PATENT DOCUMENTS

WO    WO9940502    8/1999

OTHER PUBLICATIONS

Dictionary.com, Retrieved online <URL:http//dictionary.reference.com/search?q=compile>, Compile, definition of.

(Continued)

*Primary Examiner* — Nasser Moazzami
*Assistant Examiner* — Fikremariam Yalew
(74) *Attorney, Agent, or Firm* — Patterson & Sheridan, LLP

(57) ABSTRACT

System for authenticating a user for logon to a content manager running on top of a database manager. A connect procedure connects the user to a database manager; and then a logon procedure logs on the user to the content manager selectively responsive to the user connecting to the database manager; the user being authenticated by a third party by way of a user exit or a trusted logon environment and privilege; or the user being authenticated by the content manager.

12 Claims, 8 Drawing Sheets

U.S. PATENT DOCUMENTS

| | | | | |
|---|---|---|---|---|
| 6,161,139 | A | * | 12/2000 | Win et al. ............... 709/225 |
| 6,195,705 | B1 | | 2/2001 | Leung ................. 709/245 |
| 6,256,715 | B1 | | 7/2001 | Hansen ................. 711/163 |
| 6,308,173 | B1 | | 10/2001 | Glasser et al. ............ 707/9 |
| 6,438,549 | B1 | | 8/2002 | Aldred et al. ............. 707/9 |
| 6,460,141 | B1 | | 10/2002 | Olden ................... 726/4 |
| 6,460,171 | B1 | | 10/2002 | Couvert et al. |
| 6,470,353 | B1 | | 10/2002 | Vaung et al. .......... 707/103 R |
| 6,523,027 | B1 | | 2/2003 | Underwood ............ 707/4 |
| 6,581,060 | B1 | | 6/2003 | Choy ................... 707/9 |
| 6,609,128 | B1 | | 8/2003 | Underwood ........... 707/10 |
| 6,633,878 | B1 | | 10/2003 | Underwood ........... 707/100 |
| 6,718,535 | B1 | | 4/2004 | Underwood ........... 717/101 |
| 6,772,350 | B1 | | 8/2004 | Belani et al. ............ 713/202 |
| 6,823,338 | B1 | | 11/2004 | Byrne et al. ............. 707/9 |
| 6,823,452 | B1 | * | 11/2004 | Doyle et al. ............ 713/156 |
| 6,976,023 | B2 | * | 12/2005 | Chen et al. ............. 707/9 |
| 7,016,907 | B2 | | 3/2006 | Boreham et al. |
| 7,249,374 | B1 | | 7/2007 | Lear et al. |
| 7,272,550 | B2 | | 9/2007 | Chen et al. |
| 7,284,265 | B2 | | 10/2007 | Choy et al. |
| 7,308,580 | B2 | | 12/2007 | Nelson et al. |
| 7,827,598 | B2 | | 11/2010 | Moran et al. |
| 2001/0037379 | A1 | | 11/2001 | Livnat ................. 709/219 |
| 2002/0002577 | A1 | | 1/2002 | Garg et al. |
| 2003/0200466 | A1 | | 10/2003 | Nelson et al. |

OTHER PUBLICATIONS

Sandhu et al. 'NetWare 4 as an Example of Role-Based Access Control'. ACM Press, 1996. 12 pages.

*System and Method for RDBMS to Protect Records in Accordance with Non-RDBMS Rules.* IBM Docket No. AM9-99-0207.

Crall, Chris et al. *Authorization in Enterprise-wide Distributed System A Practical Design and Application.* Proceedings 14th Annual Computer Security Applications Conference. Los Alamitos, CA: IEEE Comput. Soc., 1998. 12 pages.

Kavaln, Vasanthi et al. *A Mobile Agent for Asynchronous Administration of Multiple DBMS Servers.* Proceedings of the IEEE Third International Workshop on systems Management. Los Alamitos, CA: IEEE Compt. Soc., 1998. 1-2.

Hayton, Richard et al. *An Open Architecture for Secure Interworking Services.* Proceedings of the 17th International Conference on Distributed Computing Systems. Los Alamitos, CA: IEEE Comput. Soc. Press, 1997. 315-321.

Han, Yan et al. *Constraint Specification for Object Model of Access Control Based on Role.* Software Engineering Notes, vol. 25, No. 2, Mar. 2000. USA: ACM. 60-64. [Inspec Abstract AN 6580279, ABN C2000-06-6130S-023].

IBM Corp. *Content Manager for Multiplatforms.* Wysiwyg://2/http://www-4.ibm.com/software/data/cm/cmgr/mp/about.html; and Wysiwyg://1/http://www-4.ibm.com/software/data/cm/cmgr/mp [accessed Mar. 26, 2002 5:13 PM].

*Visual Thesaurus and Dictionery*, Top Web Results for "refresh", "update" and "incremental" [search accessed at http://thesaurus.reference.com/browse/refresh date not known, 11 pages.

Okamoto, Tatsuaki. *A Single Public-Key Authentication Scheme for Multiple Users.* Systems and Computer in Japan, vol. 18, No. 10, 1987.

*IBM Content Manager for Multiplatforms System Administration Guide*, Version 7.1. First E. Jan. 2001.

Office Action History of U.S. Appl. No. 10/131,008.

Office Action History of U.S. Appl. No. 10/131,634.

Office Action History of U.S. Appl. No. 10/131,651.

Office Action History of U.S. Appl. No. 10/131,659.

Office Action History of U.S. Appl. No. 11/182,148.

Swift et al. 'Improving the Granularity of Access Control in Windows NT.' ACM Workshop on Role Based Access Control. pp. 87-96. May 2001.

H.M. Gladney. "Access Control for Large Collections." ACM Transactions on Information Systems, vol. 15, No. 2. Apr. 1997, pp. 154-157.

Abadi et al. 'A Calculus for Access Control in Distributed Systems.' ACM Transactions on Programming Languages and Systems, vol. 15, No. 4, Sep. 1993, pp. 706-734.

Chan et al, "Incremental Update to Aggregated Information for Data Warehouses over Internet", Proceedings of the 3rd ACM international workshop on Data warehousing and OLAP, 2000, pp. 57-64.

Dictionary.com, Retrieved online <URL:http//dictionary.reference.com/search?q=compile>, Compile, definition of. [Mar. 30, 2006].

\* cited by examiner

| SYSTEM CONTROL TABLE | | | | | |
|---|---|---|---|---|---|
| DATABASE NAME | ACL BINDING LEVEL | LIBRARY ACL CODE | PUBLIC ACCESS ENABLED | ALLOW TRUSTED LOGON | |
| 102 | 104 | 106 | 108 | 105 | |

FIG. 3

| USERS TABLE | | | | | | |
|---|---|---|---|---|---|---|
| USER ID | USER KIND | USER PRIVILEGE SET CODE | GRANT PRIVILEGE SET CODE | DEFAULT ACL CODE | PASSWORD | USER NAME |
| 130 | 140 | 142 | 146 | 148 | 156 | 152 |

FIG. 4

SYSTEM AND METHOD FOR ENSURING SECURITY WITH MULTIPLE AUTHENTICATION SCHEMES

This application is a continuation and claims priority of U.S. patent application Ser. No. 10/131,008 filed 23 Apr. 2002 now U.S. Pat. No. 7,308,580 by Kenneth C. Nelson and Marilene A. Noronha for System and Method for Ensuring Security With Multiple Authentication Schemes.

CROSS REFERENCES TO RELATED APPLICATIONS

U.S. patent application Ser. No. 10/131,6751, now U.S. Pat. No. 6,976,023 issued 13 Dec. 2005, entitled "SYSTEM AND METHOD FOR MANAGING APPLICATION SPECIFIC PRIVILEGES IN A CONTENT MANAGEMENT SYSTEM", 10/131,634, entitled "SYSTEM AND METHOD FOR CONFIGURABLE BINDING OF ACCESS CONTROL LISTS IN A CONTENT MANAGEMENT SYSTEM", and 10/131,659, entitled "SYSTEM AND METHOD FOR INCREMENTAL REFRESH OF A COMPILED ACCESS CONTROL TABLE IN A CONTENT MANAGEMENT SYSTEM" filed concurrently herewith are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention relates to a system and method for managing a database. More particularly, it relates to managing access to data items through use of a plurality of authentication schemes.

2. Background Art

Content Manager is a relational database, such as the IBM DB2 database manager, client/server application. To use database manager authentication, system administrators are faced with the problem of managing users at the operating system level. In a large content manager installation, this could mean managing up to 100,000 users, a task that can be tedious and time-consuming.

Given this environment, one requirement is to allow authentication directly by content manager instead of defining users to the operating system. This is a preferred environment when content manager users do not need access to any other resources of the system.

When users do need access to other resources on the system running the content manager server, customers sometimes prefer a central repository for managing user IDs and passwords. This is most often considered to be a requirement for Lightweight Directory Access Protocol (LDAP) support, but has also included the need to use some other authentication mechanism.

It is an object of the invention to provide an improved system and method for authenticating system users.

SUMMARY OF THE INVENTION

A system and method for authenticating a user by connecting the user to a database manager; and logging on the user to a content manager running on top of the database manager selectively responsive to the user connecting to said database manager; the user being authenticated by a third party; or the user being authenticated by the content manager.

In accordance with an aspect of the invention, there is provided a computer program product configured to be operable to connect a user to a content manager running on top of a database manager.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 illustrates the system control table 31 of FIG. 2.

FIG. 4 illustrates the user table 16 of FIG. 2.

DETAILED DESCRIPTION OF PREFERRED EMBODIMENTS

Figure 1:
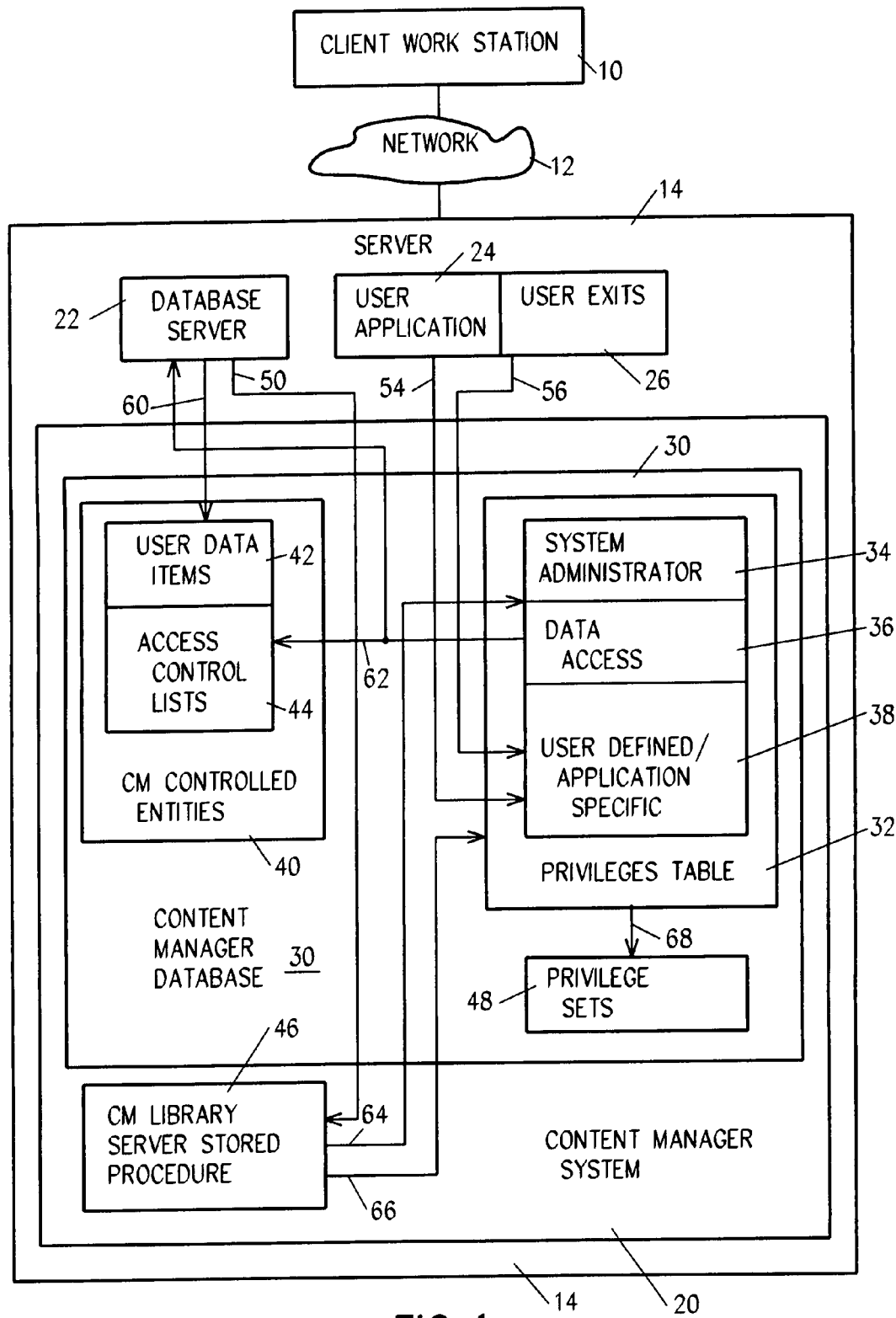
FIG. 1 is a high level diagram illustrating basic components of an exemplary embodiment of the system of the invention.

Referring to FIG. 1, in an exemplary embodiment of the system of the invention, a user at a client workstation 10 is connected through network 12 to a server 14 which includes a content manager system 20, a database server 22, user applications 24 and exits 26. Content manager system 20 includes content manager database 30 and stored procedures 46, which procedures 46, among other things, define the methods and tasks executed by content manager system 20 with respect to the tables of database 30. System database 30 includes content manager controlled entities 40, a privileges table 32, privileges sets 48, and several other tables including those shown in FIG. 2.

Figure 2:
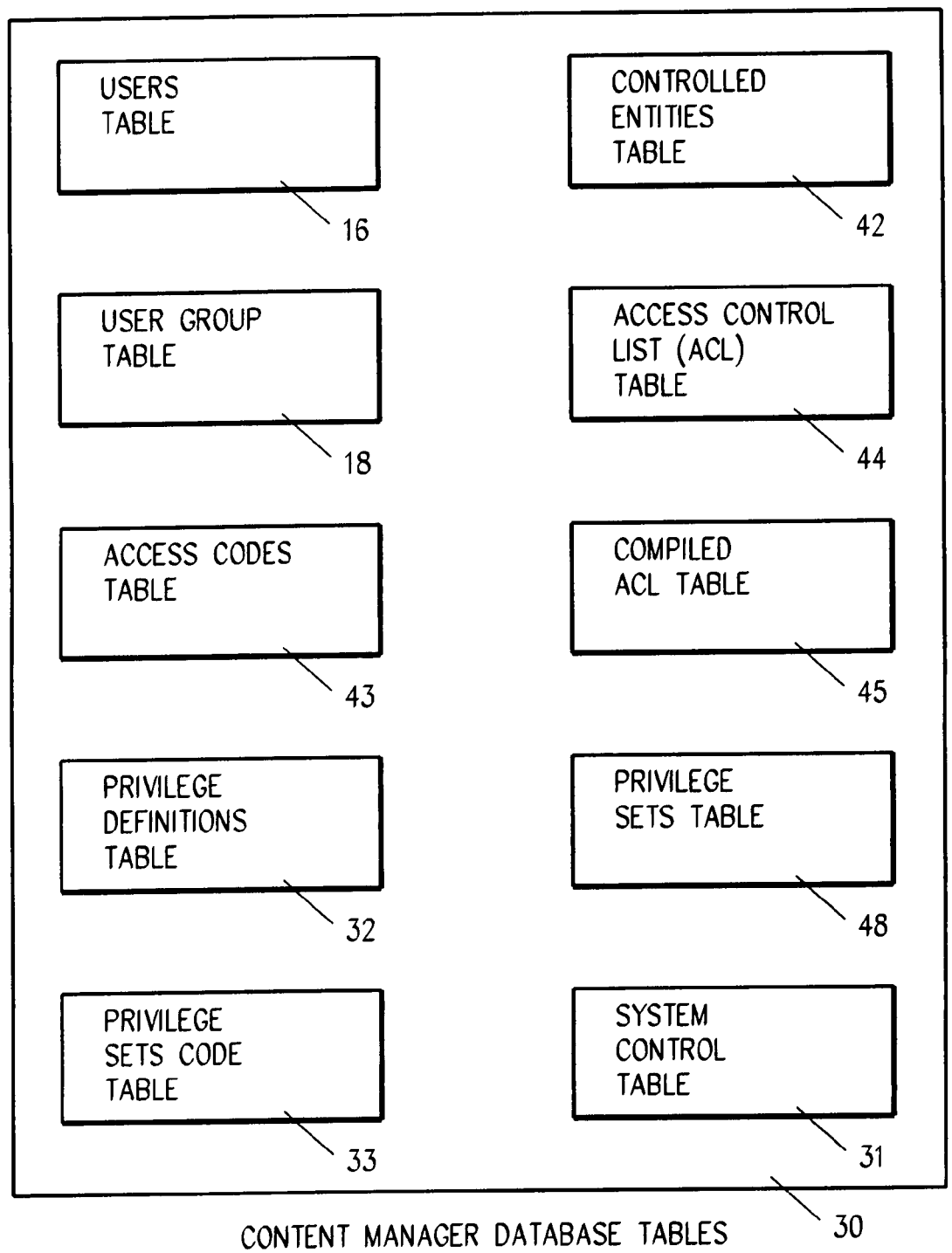
FIG. 2 is a high level diagram illustrating various tables for implementing a preferred embodiment of the system of the invention.

Referring to FIG. 2, access to entity 42 is managed through the use of several tables, including in this preferred embodiment of the invention users table 16, user groups table 18, access codes table 43, privilege definitions table 32, privilege sets code table 33, access control list (ACL) table 44, compiled ACL table 45, and privilege sets table 48.

Referring to FIG. 3, system control table 31 stores system configuration parameters for CM library server 20. Columns of table 31 include database name 102, ACL binding level 104, allow trusted logon flag 105, library ACL code 106, and public access enabled flag 108. Database name 102, an installation parameter, is the name of the library server 22. ACL binding level 104 is the access control level having, as valid values, 0 at item type level (default), 1 at item level, 2 at mixed item and item type level, and 3 at entire library level. Library ACL code 106 contains the ACL to be associated with all CM item types and items 40 if the parameter ACL binding level 104 is configured at library level. Public access enabled flag 108 indicates whether the capability of opening a bound entity public to public is enabled. When this column 108 is updated, system 20 rebuilds compiled ACL tables 45 and recreates all database table 30 views.

Referring to FIG. 4, users table 16 maintains a catalog of individual users and user groups 141. Individual users 141 can belong to none or any number of groups. Users must be assigned a number of privileges, stored in user privilege set code table 33. Defining new CM users 136 does not guarantee their existence in the data base management system (DBMS) and the operating system. The system administrator ensures the usefulness of the CM users 141 he creates. A group is a number of zero or more users 141, usually with the same job description, and assigned the same privilege set 158. A group 136 cannot belong to other groups. A group 136 does not hold default privileges for its members, nor do they relate to data base management system (DBMS) or operating system groups. Defining groups 136 minimizes the effort required to administer ACLs 143.

User table 16 columns include user ID 130, user kind 140, user privilege set code 142, grant privilege set code 146, default ACL code 148, password 156, and user name 152. User ID 130 is the ID of the individual user or group. For an individual user 141, user ID 130 should match his DBMS user ID. The CM 20 uses this value for user authentication and access control. For a group 141, user ID 130 contains the group name. User kind 140 indicates whether this entry 141 represents an individual user or a group. User privilege set code 142 denotes the user privileges for this user 141. The privilege set 158 must be defined first, and this value is not valid for groups. It is set to 1 by CM system 20 for groups. User privilege set code 142 may be updated. This user privilege set code 142 may be set to a value to allow trusted logon. Grant privilege set code 146 is the code assigned to new users 141 by a user 141 who is authorized to create users but not grant privileges to the new users. This value 146 is not valid for groups, and it can be updated. A system administrator GUI for creating a user 141 must have an entry field for that user's grant privilege set code 146. Default ACL code 148 is used to associate with items 42 when the access control 104 is configured at item level if this user 141 does not provide an ACL code when he creates items 42. Password 156 is the encrypted user password. User name 152 is the full name of this user or group 141.

Figure 5:
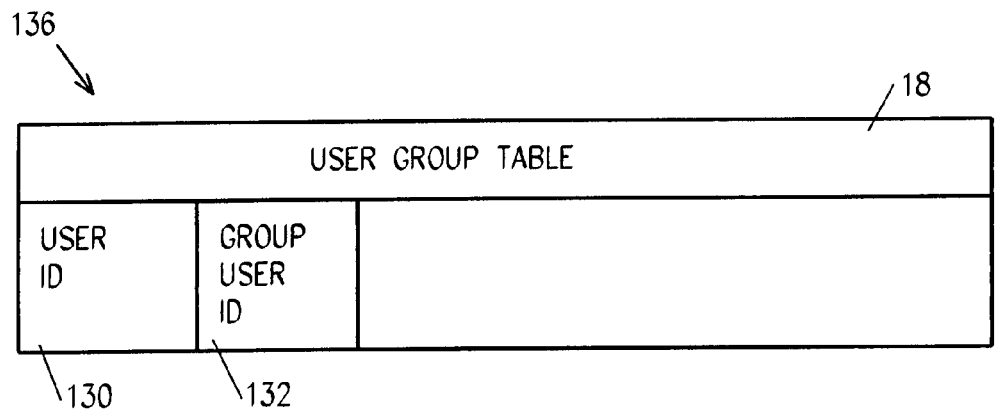
FIG. 5 illustrates the user group table 18 of FIG. 2.

Referring to FIG. 5, users group table 18 maintains associations of individual users 141 with groups 141. The columns of table 18 are user ID 130 and group user ID 132. An individual user 141 can belong to none or any number of groups 141. A group 141 cannot belong to other groups. When an individual user 141 is associated with a group 141, the user is said to be a member of that group. Associating individual users with groups in user group table 18 by a row 136 having a user ID 130 associated with a group ID 132 simplifies access control management. When defining access control specifications 143, a group 141 can be granted a number of privileges instead of granting the same set of privileges 158 to each user 141 in the group. The individual user 141 and the group 141 must be defined in the users table 16 before an association in user group table 18 can be made between the user ID 130 and the group ID 132. Rows in this table can only be deleted, not updated.

Figure 6:
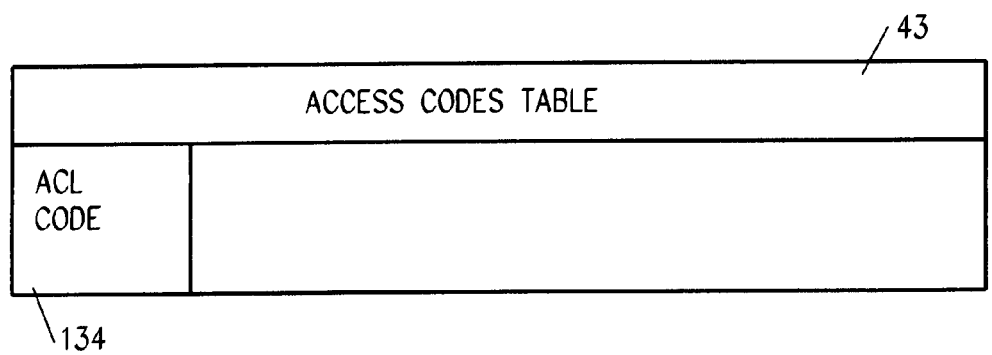
FIG. 6 illustrates the access codes table of FIG. 2.

Referring to FIG. 6, access codes table 43 maintains access control list identifiers 134. Each list 143 is uniquely identified by the access list code 134 which is generated by CM system and cannot be updated. The list specifications are stored in the access control list table 44. ACL name and description are defined in a separate keywords table (not shown). Table I sets forth an exemplary list of pre-configured ACL codes 134.

TABLE I

CM Pre-configured ACL Codes

| ACLCode 134 | ACLName* | ACLDesc* |
|---|---|---|
| 1 | SuperUserACL | ACL allows CM pre-configured user ICMADMIN to perform all CM functions on the bound entities 40. |
| 2 | NoAccessACL | ACL specifies, for all CM users, no actions are allowed on the bound entities 40. |
| 3 | PublicReadACL | ACL allows all CM users to read the bound entities 40. |

*For illustration only. Name and description are defined in a keywords table (not shown).

Figure 7:
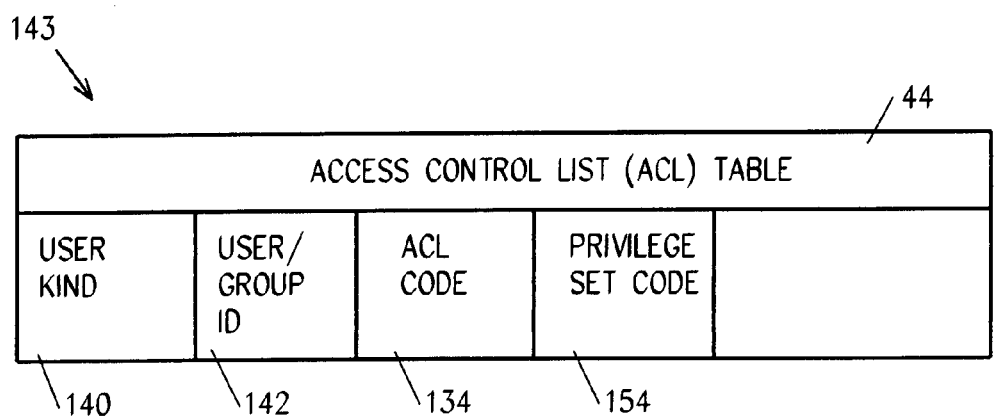
FIG. 7 illustrates the access control list (ACL) table 44 of FIGS. 1 and 2.

Referring to FIG. 7, access control list (ACL) table 44 maintains the access control list specifications. The columns of table 44 include user kind 140, user/group ID 142, ACL code 134, and privilege set code 154. ACL code 134 is the ID of an access control list. Access control lists are used by the access control algorithm to determine a user's access rights for an item 44. User ID 142 contains the ID 130 for an individual user 141 or for a group 141. User kind 140 interprets the User ID column 130 as public, group, or individual. If user kind 140 is public, the value in user ID column 130 is ignored. Privilege set code 154 is the Privilege Set 158 identifier, which indicates the operations allowed for the bound item 42. A list may contain more than one control 143, and comprises all rows 143 having the same ACL code 134. Each control 143 is composed of two elements: who (user ID 142, user kind 140) can perform what (privilege set code 154). Each CM data entity (Item) 42 must be bound to a control list in table 44. The control specifications 143 then will be enforced when items 42 are accessed. Table II is an exemplary list of pre-configured access control lists.

TABLE II

Pre-configured Access Control Lists

| ACLCode 134 | UserID 142 | UserKind 140 | PrivSetCode 154 |
|---|---|---|---|
| 1 (SuperUserACL) | ICMADMIN | 0 | 1 (AllPrivSet) |
| 3 (PublicReadACL) | ICMPUBLC | 2 (public) | 6 (ItemReadPrivSet) |

Figure 8:
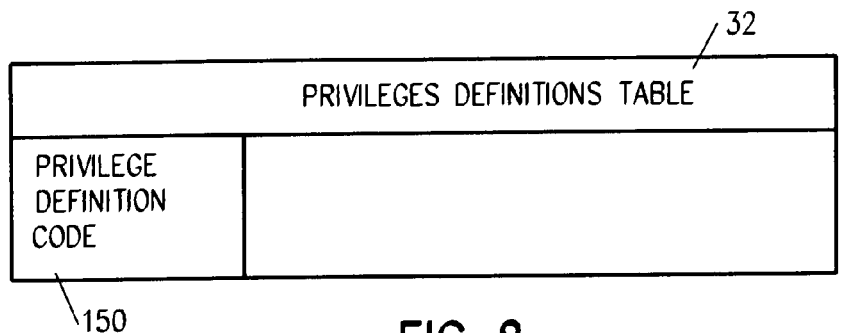
FIG. 8 illustrates the privileges definitions table of FIG. 2.

Referring to FIG. 8, privileges definitions table 32 maintains an unlimited number of CM privilege definitions, including both CM system defined privilege definitions 34, 36 and user defined privileges 38. System defined privileges 34, 36 cannot be modified. Each privilege has a system 20 generated unique privilege definition code 150 as a primary key. Codes 0 to 999 are reserved to store CM system 20 defined privileges 34, 36. 1000 and up are open for user defined privileges 38. When defining or updating privilege sets 48, this table 32 can be first queried to list all defined privileges 34-38. Applications 24 can also query this table 32 at runtime to get the definitions of the connected user's privileges and customize the application menu selections specifically suitable for that user (at client workstation 10). Privilege name and description are defined in a keywords table (not shown). Table III provides a exemplary set of system defined system administrator privilege definitions 34 and data access privilege definitions 36, showing privilege definition code 150 and corresponding example privilege definition names and privilege definition descriptions.

TABLE III

System Defined Privilege Definitions

| Priv Def Code 150 | PrivDefName* | PrivDefDesc* |
|---|---|---|
| | Sys Admin 34 | |
| 01 | AllowConnectToLogon | The CM system privilege to allow CM users to logon with different DB2 connection user ID. |
| 02 | AllowTrustedLogon | The CM system privilege to allow CM users to logon with different DB2 connection user ID and without password. |
| 40 | SystemAdmin | The CM system administration privilege. |
| 41 | SystemQuery | The privilege to query CM system information. |
| 42 | SystemDefineUser | The privilege to create and update users. |
| 43 | SystemQueryUserPriv | The privilege to query other user's privileges. |
| 44 | SystemGrantUserPriv | The privilege to grant other user's privileges. |
| 45 | SystemDefineItemType | The privilege to query, create, update and delete Item Types and Attributes. |
| | Data Access 36 | |
| 120 | ItemSuperAccess | The privilege to bypass ACL check. |
| 121 | ItemSQLSelect | The privilege to select Items using SQL interface. |
| 122 | ItemTypeQuery | The privilege to query Item Type and Attribute definitions. |
| 123 | ItemQuery | The privilege to query Items. |
| 124 | ItemAdd | The privilege to create Items. |
| 125 | ItemSetUserAttr | The privilege to update Item's user-defined attribute values. |
| 126 | ItemSetSysAttr | The privilege to update Item's system-defined attribute values. |
| 127 | ItemDelete | The privilege to delete Items. |
| 128 | ItemMove | The privilege to move Items between Item Types. |
| 129 | ItemLinkTo | The privilege to heterogeneously link Items to other Items (make the Items foreign key children). |
| 130 | ItemLinked | The privilege to set Items to be heterogeneously linked by other Items (make the Items foreign key parents). |
| 131 | ItemOwn | The privilege to set Items to own a collection of Items. |
| 132 | ItemOwned | The privilege to set Items to be owned by other Items. |

*For illustration only. Name and description are defined in an NLS Keywords table (not shown).

Figure 9:
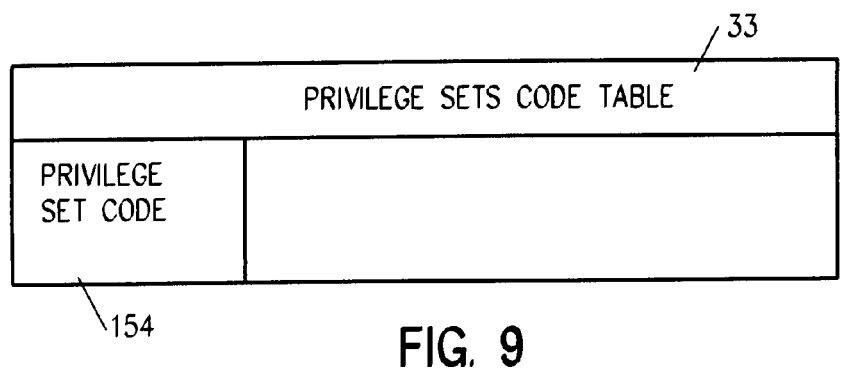
FIG. 9 illustrates the privilege sets code table 33 of FIG. 2.

Referring to FIG. 9, privilege sets code table 33 maintains privilege set definitions. A privilege set comprises an unlimited number of privileges. Each set is uniquely identified by a CM system 20 generated code, privilege set code 154. Its set member associations are stored in privilege sets table 48. Privilege set name and description are defined in a keywords table (not shown). Table IV gives an exemplary set of pre-configured privilege set codes 154 together with privilege sets names and descriptions.

TABLE IV

CM Pre-configured Privilege Set Codes

| Priv Set Code 154 | PrivSetName* | PrivSetDesc* |
|---|---|---|
| 1 | AllPrivSet | Users with this Privilege Set can perform all CM functions on all CM library entities 40. |
| 2 | NoPrivSet | Users with this Privilege Set cannot perform any CM functions on any CM library entities 40. |
| 3 | SystemAdminPrivSet | Users with this Privilege Set can perform all CM system administration and data modeling functions. |
| 4 | ItemAdminPrivSet | Users with this Privilege Set can perform all CM data modeling and Item 42 access functions. |
| 5 | ItemLoadPrivSet | Users with this Privilege Set can load Items 42 into CM library 40. |
| 6 | ItemReadPrivSet | Users with this Privilege Set can search and view CM Items 44. |
| 7 | ICMConnectPrivSet | Users with this privilege set can logon with a different UserID than the one used to Connect (Connect or database 30 UserID 130). |
| 8 | ICMTrustedLogonPrivSet | Users with this privilege set can logon with a different UserID than the one used to connect to database and without password. |

*For illustration only. Name and description are defined in a keywords table (not shown).

Figure 10:
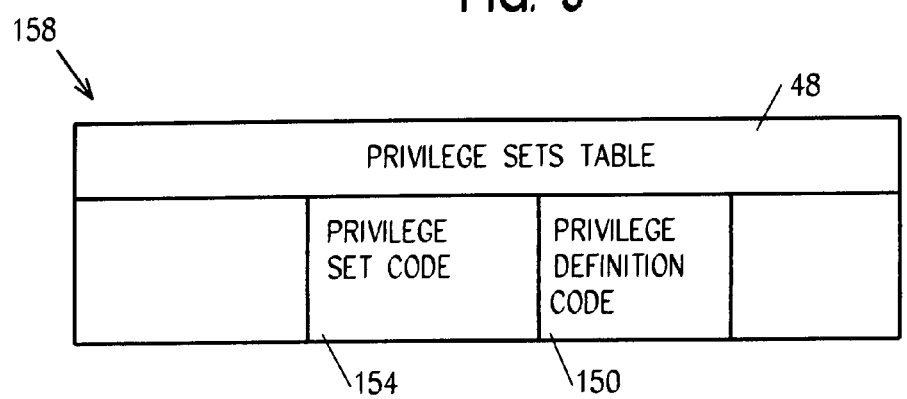
FIG. 10 illustrates the privilege sets table 48 of FIGS. 1 and 2.

Referring to FIG. 10, privilege sets table 48 maintains associations of CM privileges with the privilege sets. Rows 158 with the same privilege set code 154 form a privilege set. Rows 158 in this table 48 can only be deleted, not updated. Columns in privilege sets table 48 include privilege set code 154 and privilege definition code 150. Table V sets forth a collection of exemplary pre-configured privilege sets.

TABLE V

Pre-configured Privilege Sets

| Priv Set Code 154 | Priv Def Code 150 | PrivSetName* | PrivDefName* |
|---|---|---|---|
| 1 | 40 | AllPrivSet | SystemAdmin |
| 1 | 41 | | SystemQuery |
| 1 | 42 | | SystemDefineUser |
| 1 | 43 | | SystemQueryUserPriv |
| 1 | 44 | | SystemGrantUserPriv |
| 1 | 45 | | SystemDefineItemType |
| 1 | 120 | | ItemSuperAccess |
| 1 | 121 | | ItemSQLSelect |
| 1 | 122 | | ItemTypeQuery |
| 1 | 123 | | ItemQuery |
| 1 | 124 | | ItemAdd |
| 1 | 125 | | ItemSetUserAttr |
| 1 | 126 | | ItemSetSysAttr |
| 1 | 127 | | ItemDelete |
| 1 | 128 | | ItemMove |
| 1 | 129 | | ItemLinkTo |
| 1 | 130 | | ItemLinked |
| 1 | 131 | | ItemOwn |
| 1 | 132 | | ItemOwned |
| 3 | 40 | SystemAdminPrivSet | SystemAdmin |
| 3 | 45 | | SystemDefineItemType |
| 4 | 45 | ItemAdminPrivSet | SystemDefineItemType |
| 4 | 121 | | ItemSQLSelect |
| 4 | 122 | | ItemTypeQuery |
| 4 | 123 | | ItemQuery |

TABLE V-continued

Pre-configured Privilege Sets

| Priv Set Code 154 | Priv Def Code 150 | PrivSetName* | PrivDefName* |
|---|---|---|---|
| 4 | 124 | | ItemAdd |
| 4 | 125 | | ItemSetUserAttr |
| 4 | 126 | | ItemSetSysAttr |
| 4 | 127 | | ItemDelete |
| 4 | 128 | | ItemMove |
| 4 | 129 | | ItemLinkTo |
| 4 | 130 | | ItemLinked |
| 4 | 131 | | ItemOwn |
| 4 | 132 | | ItemOwned |
| 5 | 124 | ItemLoadPrivSet | ItemAdd |
| 5 | 128 | | ItemMove |
| 5 | 130 | | ItemLinked |
| 5 | 132 | | ItemOwned |
| 6 | 121 | ItemReadPrivSet | ItemSQLSelect |
| 6 | 123 | | ItemQuery |
| 7 | 1 | ICMConnectPrivSet | AllowConnectToLogon |
| 8 | 1 | ICMTrustedLogonPrivSet | AllowConnectToLogon |
| 8 | 2 | | AllowTrustedLogon |

*For illustration only. Name and description are defined in the NLS Keywords table.

Figure 11:
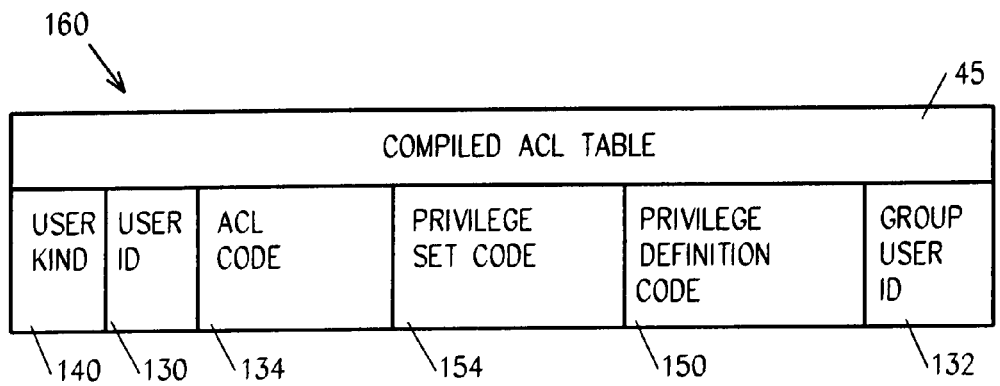
FIG. 11 illustrates the compiled ACL table 45 of FIG. 2.

Referring to FIG. 11, compiled ACL table 45 contains the compiled access control information. Columns in table 45 include user kind 140, user ID 130, ACL code 134, privilege set code 154, privilege definition code 150, and group user ID 132. User ID 130 contains only individual users. For each row 160 in compiled ACL table 45, privilege definition code 150 represents a single privilege for access to item 42. ACL code 134 is the access control list code. Privilege definition code 150 indicates the operation allowed for bound item 42. Privilege set code 154 is the privilege set code that the resolved privilege is derived from. This is a maintenance field, designed for incremental refresh on this table. For example, when a privilege set 158 is modified, rows 160 with the corresponding privilege set code 154 are affected, while other rows 160 are not. User ID 130 contains the authorized user's User ID. Group user ID 132 contains the group's User ID if this entry 160 is derived from an ACL rule for group. This column 132 provides a maintenance field, designed for incremental refresh. It contains null if the ACL rule user kind 140 is not for group. User kind 140 indicates which ACL rule type this row 160 is derived from: public, group or individual user.

Multiple Authentication Schemes

Figure 12:
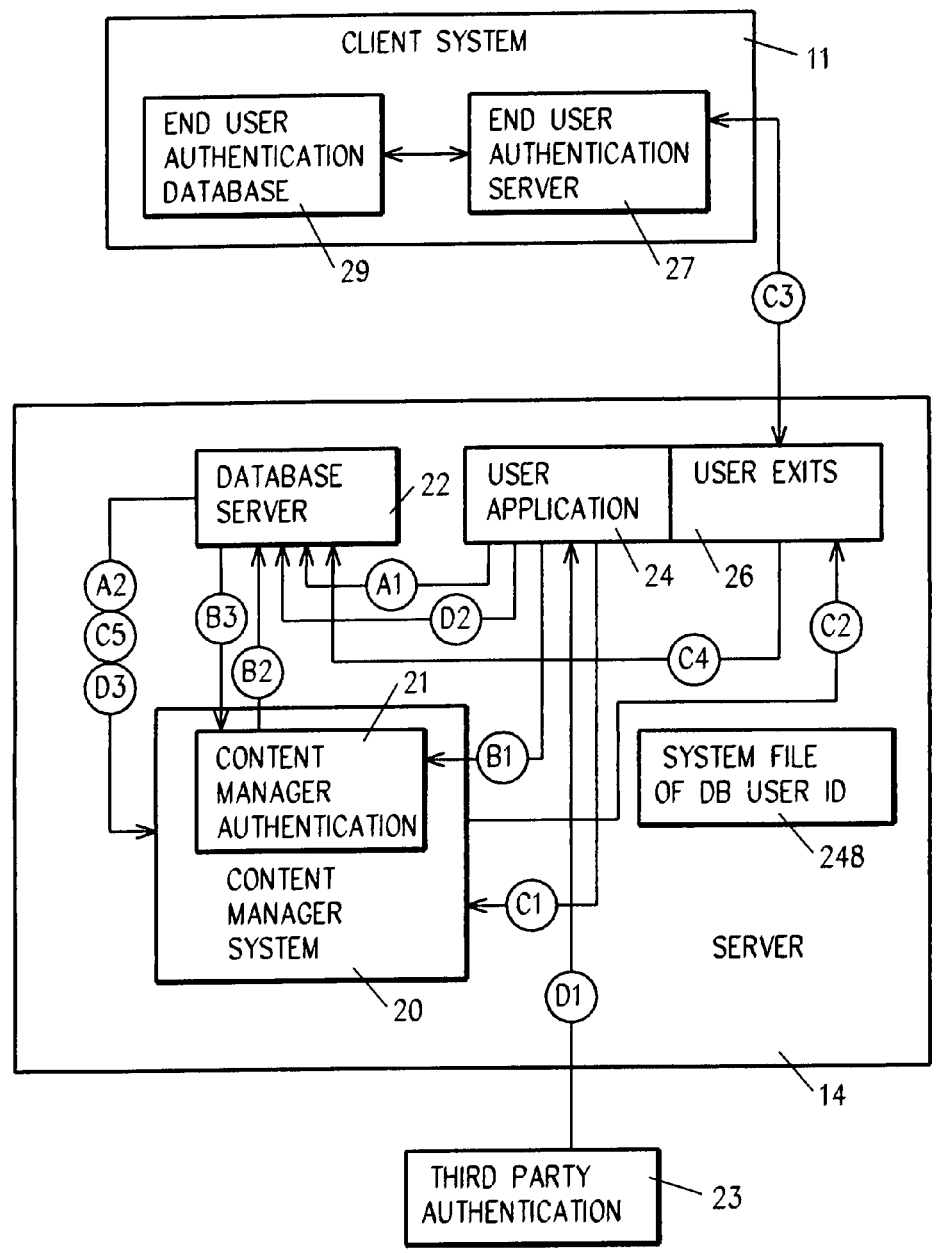
FIG. 12 illustrates processing paths of four authentication scenarios of the preferred embodiment of the invention.

Referring to FIG. 12, in accordance with a preferred embodiment of the invention, a plurality of schemes are implemented within a single product for handling authentication. Four such authentication schemes, or cases, are:

A) DB2 authentication
B) Content Manager (CM) authentication
C) 3rd party authentication after connecting to CM
D) 3rd party authentication before connecting to CM System objects of interest to this embodiment of the invention include server 14, which includes database server 22, user application 24 and exit 26, a system file of database user IDs, and content manager system 20 which includes as a CM library server stored procedure 46 content manager authentication procedure 21. Depending upon the logon scenario, other objects include third party authentication 23 and client system 11, which includes an end user authentication server 27 and database 29 of user IDs and passwords. The interrelationship of these objects will be explained hereafter in connection with FIGS. 13-16.

Figure 13:
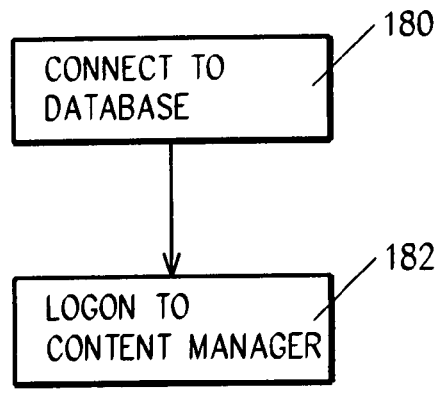
FIG. 13 illustrates the two phases required for accessing the content manager of FIG. 12.

Referring to FIG. 13, access to content manager system 20 is accomplished in two phases: in phase 180, a user connects to database 22, and in phase 182, logs on to content manager 20.

Figure 14:
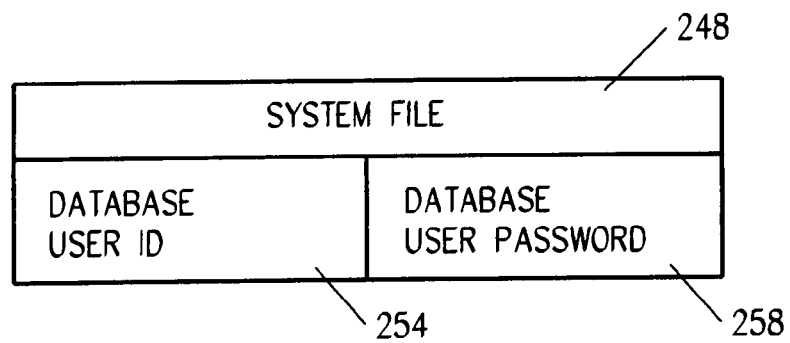
FIG. 14 illustrates a system file.

Referring to FIG. 14, as a result of system initialization and connect to database 180, a system object 248 is created which includes in field 254 the user ID for connecting to database 22, and in field 258 the database 22 user password 258.

Figure 15:
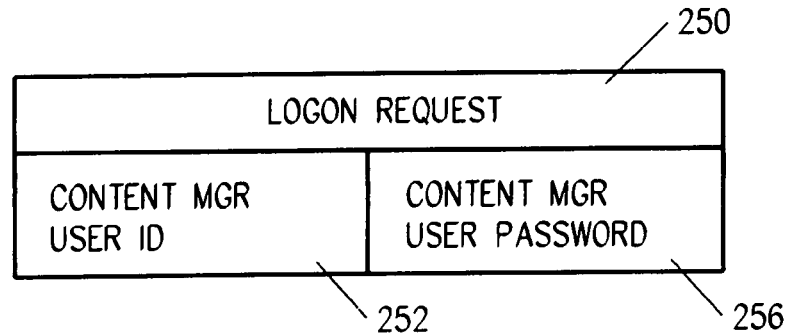
FIG. 15 illustrates a logon request.

Referring to FIG. 15, a content manager logon request 250 includes content manager (CM) user ID 252 and CM password 256. CM password 256 may have null value.

Figure 16:
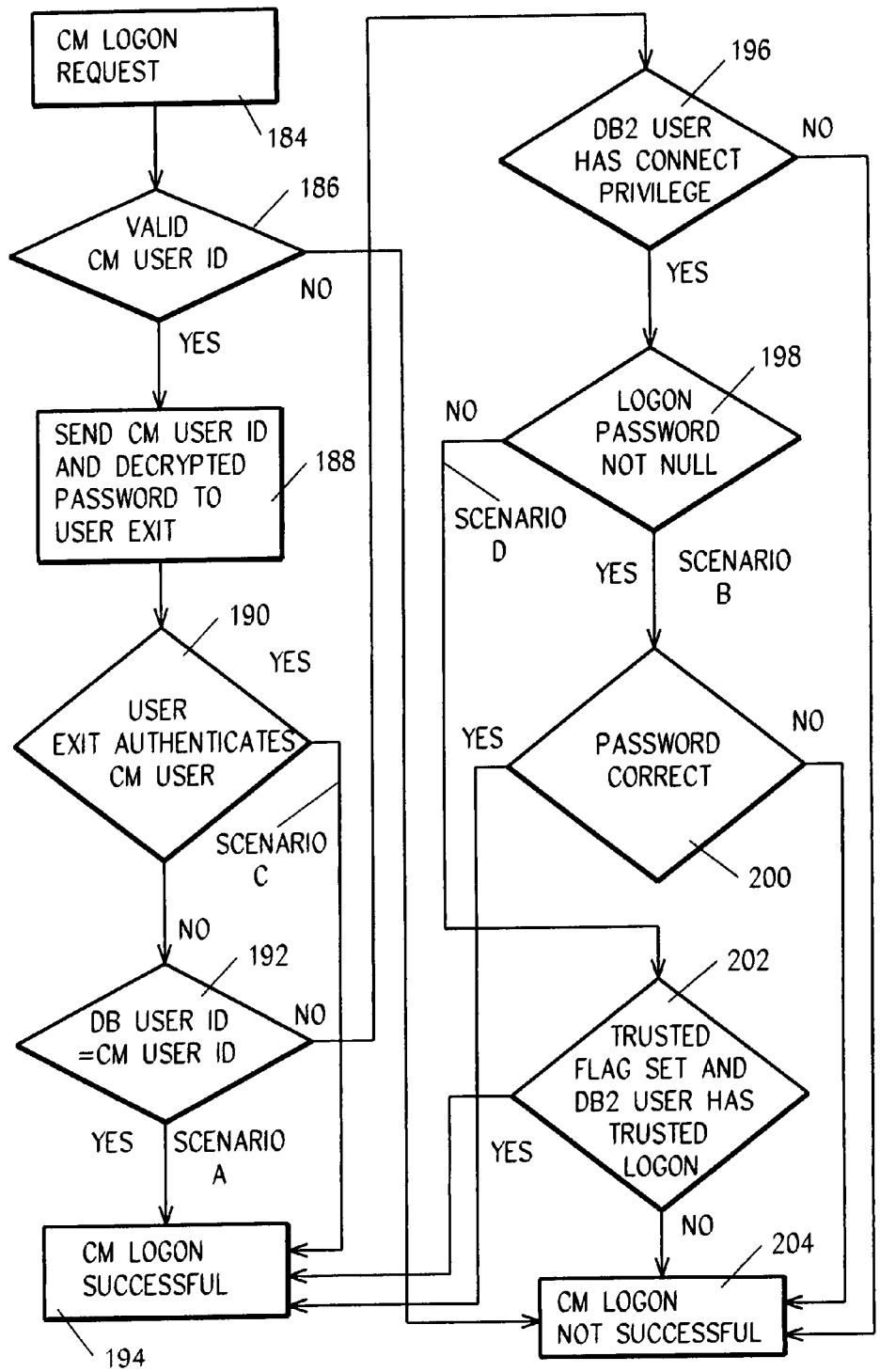
FIG. 16 illustrates the method of the preferred embodiment of the invention for accessing the content manager database of FIGS. 1, 2, and 12 according to four scenarios.

Referring to FIG. 16, the process 182 for logging on to content manager 20 is described. In step 184, content manager system 20 receives a CM logon request 250. In step 186, CM 20 validates the CM user ID 252 as a valid CM user 141 in users table 16 (FIG. 4). If valid, execution continues; if invalid, CM logon is not successful, and an error return code is generated in step 204.

In step 188, CM 20 decrypts CM user password 256 and sends it to user exit 26 along with CM user ID 252.

Table VI contains an exemplary embodiment of user exit 26. In this example, the function in CM 20 that handles a logon request is ICMlogon. User exit 26 may, according to scenario C, access end user authentication server 27 and database 29 to perform the authentication of CM user ID 252.

In step 190, CM 20 determines from user exit 26 return codes and interface objects if CM user 252 has been authenticated. According to scenario C, if the user has been authenticated by user exit 26, in step 194 the CM logon procedure updates a users count in system control table 31, retrieves the privileges for CM user ID 252 and returns a successful logon request.

In the example of Table VI, after UserExit 26 is executed, ICMLogon examines output parameters plReason and plRC. If plRC returns an error, ICMLogon will stop its execution. If plRC returns success or a warning message, in step 194, ICMlogon will continue execution. If plReason is returned with value 0, ICMLogon will continue to step 192 to do password validation. If plReason is returned with value 1, in step 194, ICMLogon will bypass password validation.

TABLE VI

User Exit

User Exit Interface:
| | | |
|---|---|---|
| | char | *pszLanguage, |
| | char | *pszUserID, |
| | char | *pszPassword, |
| | char | *pszNewPassword, |
| | char | *pszApplication, |
| | short | *psUserDomain, |
| | char | *pszLDAPInfo, |
| | long | *plRC, |
| | long | *plReason, |

TABLE VI-continued

User Exit

```
            long       *plExtRC,
            long       *plExtReason)
// Input Params :  char    *pszLanguage - Language Code
//                 char    *pszUserID     - UserID
//                 char    *pszPassword - decrypted password
//                 char    *pszNewPassword - new decrypted
//                          password (if new password was
//                          provided)
//                 char    *pszApplication - the appl. name
//                 char    *pszLDAPInfo - The path in the LDAP
//                          server for this User
//
// Output Params:  long    *plRC          - pointer to return code
//                 long    *plReason      - pointer to reason code
//                 long    *plExtRC       - pointer to DB2 SQL
//                                          return code
//                 long    *plExtReason   -pointer to DB2 SQL
//                                          reason code
//
// Returns:   *plRC
//
// Return Codes: the following are the return codes (*plRC)
// expected by CM Logon
//         0    - RC_OK -- Validation Ok. ICMLogon continues
//                          normal execution.
//         7123 - RC_INVALID_PARAMETER -- The name of any
//                          invalid pointer or value will be logged.
//                          Logon is denied.
//         7015 - RC_UNEXPECTED_SQL_ERROR -- SQL error. Logon
//                          is denied.
//         7172 - RC_INVALID_PASSWORD -- The password does
//                          not match the password defined for this
//                          user. Logon is denied.
//         7173 - RC_MAX_LOGON_PASSWORD_RETRY -- The maximum
//                          number of retries with wrong password
//                          has been reached. Logon is denied.
//         7203 -  RC_INVALID_NEWPASSWORD -- Set only by the
//                          exit indicating the new password is not
//                          valid
//         7171 -  RC_PASSWORD_EXPIRED -- The password must
//                          be changed. Call ICMLogon again with a
//                          new password. Logon is denied.
//         7160 -  RC_LOGON_MAX_USER_ERROR -- The maximum
//                          number of concurrent users has been
//                          reached. Logon is denied.
//         7094 -  RC_ALREADY_LOGGED_ON -- The UserID is
//                          already logged on to CM
//         4751 -  RC_LOGON_MAX_USER_WARNING -- The maximum
//                          number of concurrent users has been
//                          reached. Logon is allowed, but a
//                          warning message should be displayed.
//
// Reason Code (*plReason) :  set Reason code according to the
//                          following rule:
//         *plReason = 0 -   ICMLogon will do password
//                          validation
//         *plReason = 1 -   ICMLogon will bypass password
//                          validation.
//
//***********************************************************
extern long ICMLogonExit(
        char    *pszLanguage,
        char    *pszUserID,
        char    *pszPassword,
        char    *pszNewPassword,
        char    *pszApplication,
        short   *psUserDomain,
        char    *pszLDAPInfo,
        long    *plRC,
        long    *plReason,
        long    *plExtRC,
        long    *plExtReason)
```

TABLE VI-continued

User Exit

```
{
  // here comes the code   //
  *plRC=0;
  *plReason = 0;
  return *plRC;
}
```

In step 192, if user exit 26 does not authenticate CM user ID 252, it is determined if DB user ID 254 equals CM user ID 252. If they are equal, according to scenario A, the user is registered to both DB 22 and CM 20 by the system administrator, password validation occurred during connect to database step 180, and in step 194 CM 20 logon returns a successful logon request with the user privileges for CM user ID 252.

If in step 192 it is determined that DB user ID 254 and CM user ID 252 are not the same, then CM authentication 21 must execute.

In step 196, CM authentication 21 determines if DB user 254 has CM privilege set code 142 for connect (ICMConnectPrivSet). If not, in step 204 CM logon is denied. If so, and step 198 determines that CM logon password 256 is not null, then according to scenario B, in step 200 CM authentication determines if CM user password 256 matches password 156 for this user 252. If so, in step 194 CM logon returns successful and, if not, in step 204 CM logon returns not successful.

If CM user password 256 is null, according to scenario D, in step 202 CM authentication determines if allow trusted logon flag 105 is set in system control table and if this DB2 user 254 has user privilege set code 142 for trusted logon. If either is not true, in step 204 logon is denied. If both are true, CM logon 194 returns successful.

For scenario A), DB2 22 authentication is used where performance and reliance on the security services of the operating system 14 are required. This requires that the same user ID be maintained by the system administrator for the user in both the database server and the content manager server. In an exemplary embodiment, a user ID is defined in client 10 for use in DB2 22. All users defined, for example, for a Windows NT operating system 14 are also defined as DB2 22 users. Passwords defined for each user in the NT system are also used to connect to DB2. This approach could be burdensome. For instance, CM 20 is an application that runs on top of DB2 22, and a user that uses CM 20 also needs to be a DB2 22 user. In a large installation of many clients 10, the manager may have to manage tens of thousands of users both in the CM 20 context and also in the Windows NT system 14.

For scenario B), to reduce the burden of managing users at the operating system level, content manager system 20 offers its own user authentication mechanism. According to this scenario, CM 20 allows one DB2 22 user to be shared among many CM users 141. So, for this case B) one shared DB2 user 141/254 is used for all CM users. This DB2 shared user 141 has no privilege 142 to use CM 20, rather all privileges 142 to use the CM application 20 are assigned to CM users 141 other than the one shared DB2 user. The shared DB2 user ID has a very basic privilege set, the connect privilege set (Table V, privilege set code 154=7 and privilege definition code 150=1, Table IV privilege set code 154=7). The connect privilege set for the one shared DB2 user 254 is a privilege set that is checked in content manager (CM) 20 that this one shared user id can be shared among CM users 252. In this case, there must still be a valid user ID 130/254 and password 156/258 used to connect to the database 20, and then a different user ID 130/252 and password 156/256 is sent as part of a "logon" request 250 to content manager 20. To support this model, the content manager "privilege" mechanism is used. The UserID 130/254 used to connect to CM database 30 is defined only with the privilege 142 to call "logon" with a different CM user ID 130/252. This ensures that even if a user 141 discovers the algorithm used for encryption of the user ID 130/password 156, logging on with that user ID 130/254 would not enable access to any resources on the server 20.

For scenario C), where authentication is performed after connecting to content manager 20, exit 26 is enabled. The password 256 provided by the client 10 is encrypted before being sent to the server 14. There is decrypted, and passed to the user exit 24 for authentication. In the log on procedure, this exit allows the end user to plug in his own user exit 26 to validate his own CM user id and password in the logon request to the CM 20 application. The password comes to CM 20 encrypted. CM 20 decrypts the password and sends it to the user exit 26 in its original form for validation. User exit 26 will typically access an end user client system 11 to have server 27 conduct authorization against an authentication database 29 of valid user IDs 252 and passwords 256. After user exit 26 executes, logon will check if CM user 252 had been authenticated by the user exit 26. If user application 24 provides no user exit 26, CM logon 21 takes care of validating the user.

For scenario D), a user connects to database server 22, and then logs on 250 with a CM user ID 252 in a trusted logon system environment. The trusted logon system environment is, for example, initialized by the system administrator setting trusted logon flag 105 true in system control table 31. The user accesses CM 20 through allow trusted logon, which is an environment where another application 23 has already validated this DB user id 254 and password 258. As with scenario B), in scenario D) the DB user ID 254 is a shared ID used just to connect to database server 22, and for scenario D) must have user privilege set code 142 for trusted logon. When these conditions are met (flag 105 is true, and privilege set code 142 is allow trusted logon for this shared DB user ID 254) CM 20 will trust that authentication has been done by a third party 23, and allow this user 254 to access CM.

Advantages Over the Prior Art

It is an advantage of the invention that there is provided an improved system and method for authenticating system users.

It is a further advantage of the invention that there is provided an improved system and method for authenticating system users for access to content manager controlled entities.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for authenticating a user for access to controlled entities maintained at a server, said server including a content management system having a content manager, a database manager, an user application, and user exits, comprising:
    maintaining said controlled entities within said content manager, said controlled entities including an access control list table bound to user data items, said access control list table including, in rows, for each user and user group: user kind, user identifier, access control list code, and privilege set code, each privilege set code corresponding to a privilege set;
    said maintaining, responsive to modification of a given privilege set, including incrementally refreshing said access control list table to refresh only those rows having a privilege set code corresponding to said given privilege set;
    connecting said user to said database manager; and
    logging on said user to said content manager running on top of said database manager to enable access by said user to said user data items, selectively responsive to at least one of:
        said user connecting to said database manager;
        said user being authenticated by at least one of: (i) said content manager and (ii) a third party;
        a user exit authenticating content manager (CM) indicia of said user; and
        database (DB) indicia of said user matching content manager (CM) indicia of said user.

2. The method of claim 1, said user being logged on to said content manager by content manager authentication responsive to said content manager receiving database (DB) user indicia for a DB user having connect privilege and a correct logon password.

3. The method of claim 1, said user being logged on to said content manager by third party authentication responsive to said user exit authenticating said content manager (CM) indicia of said user.

4. The method of claim 1, said user being logged on to said content manager by third party authentication responsive to said content manager receiving database (DB) user indicia for a DB user having connect and trusted logon privileges in a trusted logon system environment.

5. A system for authenticating a user for access to controlled entities maintained at a server, said server including a content management system having a content manager, a database manager, an user application, and user exits, comprising:
    one or more computer processors; and
    a memory containing a program which, when executed by the one or more computer processors, is configured to perform an operation comprising:
        a maintenance procedure for maintaining said controlled entities within said content manager, said controlled entities including an access control list table bound to user data items, said access control list table including, in rows, for each user and user group: user kind, user identifier, access control list code, and privilege set code, each privilege set code corresponding to a privilege set;
        said maintenance procedure, responsive to modification of a given privilege set, for incrementally refreshing said access control list table to refresh only those rows having a privilege set code corresponding to said given privilege set;
        a connect procedure for connecting said user to said database manager; and
        a logon procedure for logging on said user to said content manager selectively responsive to at least one of:
            said user connecting to said database manager;
            said user being authenticated by at least one of: (i) a third party and (ii) said content manager;
            a user exit authenticating content manager (CM) indicia of said user; and
            database (DB) indicia of said user matching content manager (CM) indicia of said user.

6. The system of claim 5, said user being logged on to said content manager by content manager authentication responsive to said content manager receiving database (DB) user indicia for a DB user having connect privilege and a correct logon password.

7. The system of claim 5, said user being logged on to said content manager by third party authentication responsive to said user exit authenticating said content manager (CM) indicia of said user.

8. The system of claim 5, said user being logged on to said content manager by third party authentication responsive to said content manager receiving database (DB) user indicia for a DB user having connect and trusted logon privileges in a trusted logon system environment.

9. A non-transitory computer readable storage medium containing a program of instructions which, when executed, performs an operation for authorizing access by a user for access to controlled entities maintained at a server, said server including a content management system having a content manager, a database manager, an user application, and user exits, said operation comprising:
    maintaining said controlled entities within said content manager, said controlled entities including an access control list table bound to user data items, said access control list table including, in rows, for each user and user group: user kind, user identifier, access control list code, and privilege set code, each privilege set code corresponding to a privilege set;
    said maintaining, responsive to modification of a given privilege set, including incrementally refreshing said access control list table to refresh only those rows having a privilege set code corresponding to said given privilege set;

connecting said user to said database manager; and logging on said user to said content manager running on top of said database manager to enable access by said user to said user data items, selectively responsive to at least one of:

said user connecting to said database manager;

said user being authenticated by at least one of: (i) said content manager and (ii) a third party;

a user exit authenticating content manager (CM) indicia of said user; and database (DB) indicia of said user matching content manager (CM) indicia of said user.

10. The computer readable storage medium of claim 9, said user being logged on to said content manager by content manager authentication responsive to said content manager receiving database (DB) user indicia for a DB user having connect privilege and a correct logon password.

11. The computer readable storage medium of claim 9, said user being logged on to said content manager by third party authentication responsive to said user exit authenticating said content manager (CM) indicia of said user.

12. The computer readable storage medium of claim 9, said user being logged on to said content manager by third party authentication responsive to said content manager receiving database (DB) user indicia for a DB user having connect and trusted logon privileges in a trusted logon system environment.

* * * * *